United States Patent
Ur et al.

(10) Patent No.: US 10,869,265 B1
(45) Date of Patent: Dec. 15, 2020

(54) SYSTEM, METHOD, AND COMPUTER PROGRAM FOR IMPLEMENTING VARIOUS DEVICE DECISIONS REGARDING EDGES/TOWERS

(71) Applicant: Amdocs Development Limited, Limassol (CY)

(72) Inventors: Shmuel Ur, Shorashim (IL); Nir Fattal, Vehud-Monosson (IL); Gad Yitzhak Weissman, Hod Hasharon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/411,607

(22) Filed: May 14, 2019

Related U.S. Application Data

(60) Provisional application No. 62/673,053, filed on May 17, 2018.

(51) Int. Cl.
*H04W 48/20* (2009.01)
*H04W 76/15* (2018.01)

(52) U.S. Cl.
CPC .......... *H04W 48/20* (2013.01); *H04W 76/15* (2018.02)

(58) Field of Classification Search
CPC ..... H04W 48/20; H04W 76/15; H04W 84/06; H04B 7/18528; H04B 7/18571; H04B 7/18576
See application file for complete search history.

(56) References Cited

U.S. PATENT DOCUMENTS

| 2009/0278705 | A1* | 11/2009 | Chhabra | H04W 48/20 340/8.1 |
| 2013/0267166 | A1* | 10/2013 | Gu | H04W 88/16 455/39 |
| 2017/0048876 | A1* | 2/2017 | Mahindra | H04M 15/66 |

* cited by examiner

*Primary Examiner* — Sharad Rampuria
(74) *Attorney, Agent, or Firm* — Zilka-Kotab, P.C.

(57) ABSTRACT

A system, method, and computer program product are provided for implementing various device decisions regarding edges/towers. The method comprises one or more of: choosing a single best edge or tower for a device; splitting workloads between multiple edges or towers; and controlling multiple smart devices and deciding how to split a workload between them.

16 Claims, 8 Drawing Sheets

SYSTEM, METHOD, AND COMPUTER PROGRAM FOR IMPLEMENTING VARIOUS DEVICE DECISIONS REGARDING EDGES/TOWERS

RELATED APPLICATIONS

The present application claims priority to U.S. Provisional Application No. 62/673,053, entitled "SYSTEM, METHOD, AND COMPUTER PROGRAM FOR IMPLEMENTING VARIOUS DEVICE DECISIONS REGARDING EDGES/TOWERS," filed on May 17, 2018, the entire contents of which is incorporated herein by reference.

FIELD OF THE INVENTION

The present invention relates to device decisions regarding edges/towers.

BACKGROUND

Currently the way a cell phone chooses a tower or an edge is that there are edges/towers the provider has a contract with and those it does not. The phone knows which are which, and chooses, among those with contracts, the best tower by signal strength. Alternatively, the phone could indicate to the provider the options and be told to who to contact in return. There are services in which a device hops to another if it becomes the strongest. This service allows a device to survey possible towers/WiFi.

While the device moves, it polls the towers. The typical algorithm is: connect to the best of those approved, and the best depend on simple single strength, not on other characteristics. If for example, one is a tower and one is an edge, the edge could do many things besides communication, yet if the tower is stronger it still may connect to the tower, not taking them into account. The solution should not be one size fits all as it depends on the workloads of the phone, the edge, and connection quality.

There are many devices that also have the phone functionality. These devices include cars, phone, watches, AR glasses, etc. Each device may have different needs, different applications running on it, different power needs, and very different displays. They can all connect via one channel or more (e.g. cell, WiFi, Bluetooth, etc.). But currently, each device connects to only one tower. Further, for some devices, they commonly use one channel for all the data needs at a time. So, for example, the phone may be connected to house WiFi and a tower but all the data will go through the WiFi.

There is thus a need for addressing these and/or other issues associated with the prior art.

SUMMARY

A system, method, and computer program product are provided for implementing various device decisions regarding edges/towers. The method comprises one or more of: choosing a single best edge or tower for a device; splitting workloads between multiple edges or towers; and controlling multiple smart devices, connected to multiple edge/towers, and deciding how to split a workload between them in order for those workloads will be associated with appropriate edge/tower.

DETAILED DESCRIPTION

Figure 1:
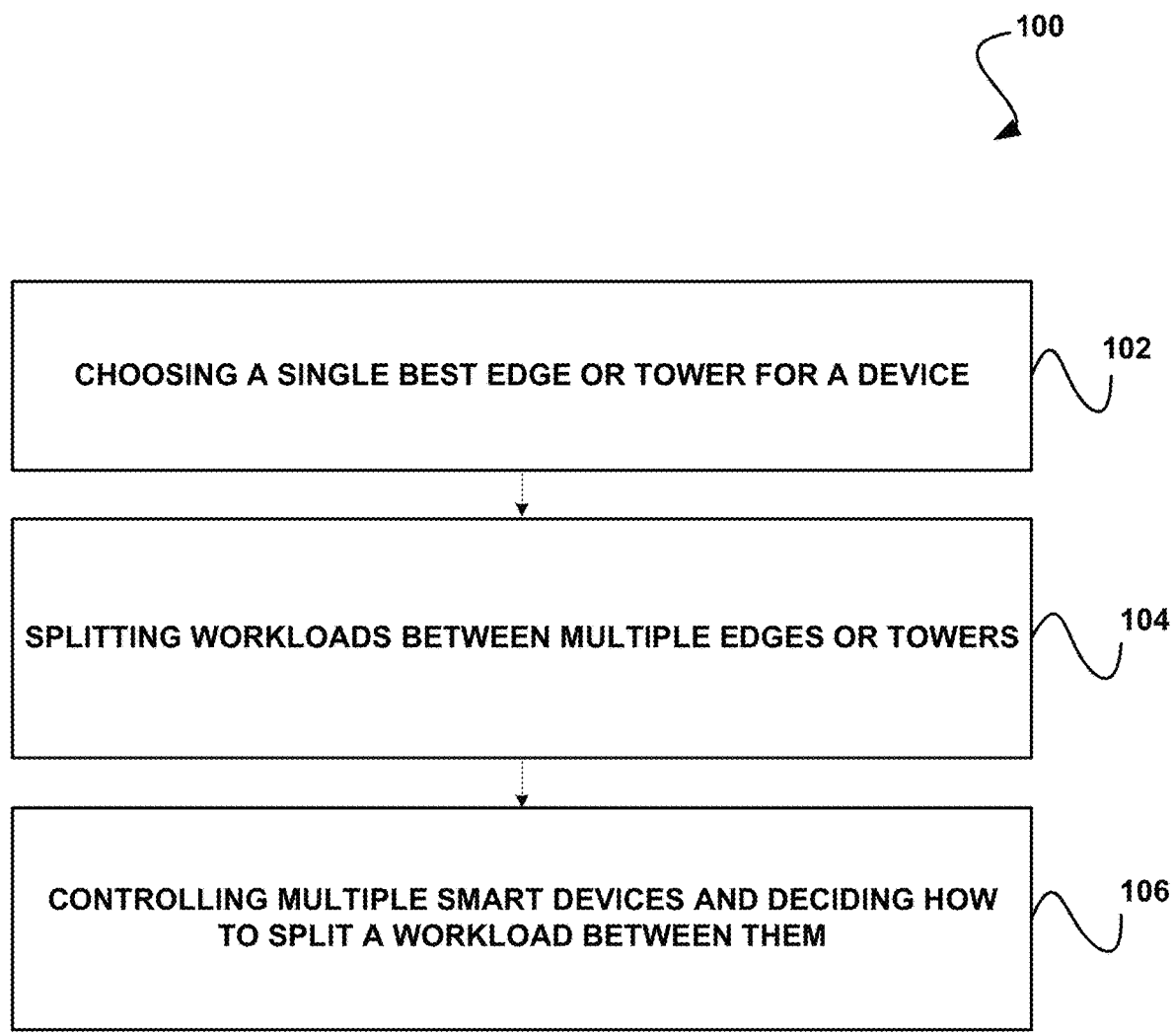
FIG. 1 illustrates a method for implementing various device decisions regarding edges/towers, in accordance with one embodiment.

FIG. 1 illustrates a method 100 for implementing various device decisions regarding edges/towers, in accordance with one embodiment.

The method comprises one or more of: choosing a single best edge or tower for a device (See operation 102); splitting workloads between multiple edges or towers (See operation 104); and controlling multiple smart devices and deciding how to split a workload between them (See operation 106).

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
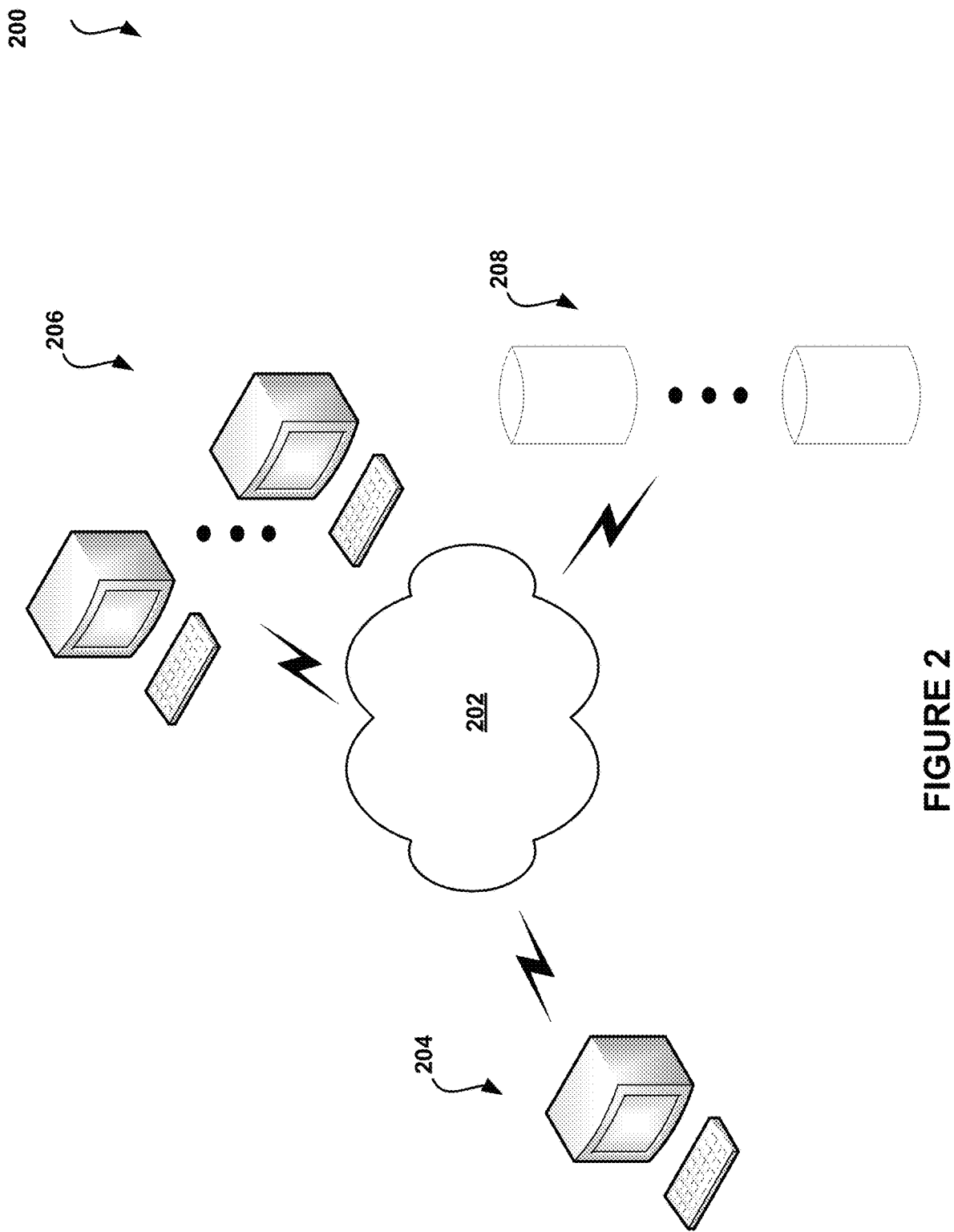
FIG. 2 shows a system for implementing various device decisions regarding edges/towers, in accordance with one embodiment.

FIG. 2 shows a system 200 for implementing various device decisions regarding edges/towers, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202. The system 204 may also be in communication with one or more repositories/databases 208. The system 204 and the systems 206 are intended to represent generic devices and may represent any device capable of computation and/or communication, such as a computer, a phone, a car, and/or various other types of devices. The networks 202 may include any type of communication network. In operation, the system 200 may function as a platform to implement the three main embodiments described below, etc.

Currently the way a cell phone chooses a tower or an edge is that there are edges the provider has a contract with and those it does not. The phone knows which are which, and chooses, among those with contracts, the best tower by signal strength. There are services in which a device hops to another if it becomes the strongest. This service allows a device to survey possible towers/WiFi.

While the device moves, it polls the towers. The typical algorithm is: connect to the best of those approved, and the best depend on simple single strength, not on other characteristics. If for example, one is a tower and one is an edge, the edge could do many things, and still connect to the tower. The solution should not be one size fits all as it depends on the workloads of the phone, the edge, and connection quality.

There are many devices that also have the phone functionality. These devices include cars, phone, watches, AR glasses, etc. Each device may have different needs, different applications running on it, different power, and very different displays. They can all connect via one channel or more (e.g. cell, WiFi, Bluetooth, etc.). But currently, each device connects to only one tower. Further, for some devices, they commonly use one channel for all the data needs at a time. So, for example, the phone may be connected to house WiFi and a tower but all the data will go through the WiFi.

In this document, the term phone may be used, however such description may be applicable to various devices. In other words, when using the term phone, it applies to any device with phone capabilities that runs multiple workloads (or at least a computationally intensive workload), such as a car or AR glasses, etc.

As a first embodiment, a method may be implemented to choose the single best edge/tower for a device. When a phone moves, it checks all available edges/towers, those that are willing to give it service and obtain from them information about the name of the edge (unique), the quality of communication, and signal strength, etc. The phone can also obtain information about latency (ping), computation situation (if it can provide computations), speed costs, and specific hardware/software, etc. Collecting this information continuously is free, as the edges/towers/providers would like to give service for which they charge.

The phone knows the workloads it is running. A new feature of a workload may be that it indicates how much communication it needs, how much to compute, and what latency is needed, etc. This is not usually the specific latency that is needed but what is good for it, the maximum latency it can tolerate. It could be also just a name of workload with a table of needs for the workload existing at the provider.

The phone then sends a table with this information of all available edges to its provider. It may also tell the provider which new workloads it may want. The assumption is that the provider knows the edges and their capabilities.

Thus, information includes what the edges can provide (one table), and what the device currently needs according to the current workloads (another table).

Alternatively, the device may decide to work with edges itself, not through a provider, handling payments.

The provider chooses which edge the device should talk to and tells that edge that the client will talk to it. The choice is based on contracts the provider has with the edge/tower, but is also based on the needs of the user and the capabilities of the edge. The user may be willing to pay more for more capabilities, so it is not a simple list but depend on user needs, connection quality (like now), edge capabilities (new), contracts (changed), etc.

The device or provider decides which edge to talk to based on three main parameters: 1) capabilities of the edge/provider with respect to the device (e.g. far edge is not as good for multiple parameters but the same on computation, etc.); 2) needs of the device depending on the workload it is now running; and 3) costs to get the service. An optimization problem is solved based on all those parameters, and the winning edge gets to supply the service to the device.

A simple optimization may look as follows: the device has four workloads, each workload has needs reflected in bandwidth, latency, and computation (which will impact latency). The device also decides (or uses a default) as to how important each workload is. Table 1 illustrates this example.

TABLE 1

| Workload | Broadband | latency | compute | Importance |
| --- | --- | --- | --- | --- |
| YouTube | 1M | Less important | Less important | 20% |
| Waze | 50K | 1,000 | Less important | 30% |
| AR | 1M | 20 | Impacts latency | 40% |
| Whatsup | 50K | 2000 | Less important | 10% |

Each edge/tower gets a score on each workload. It also has a cost. So, together a system can calculate a total score per edge/tower and the total cost. For example, this could be for a tower with good computation but no computing, so bad latency if computation is needed.

TABLE 2

| App | Score | Cost |
| --- | --- | --- |
| YouTube | 90 | 1 |
| Waze | 90 | .05 |
| AR | 40 | 1 |
| Whatsup | 90 | .05 |
| Total | 70 | 2.1 |

This can be compared to an edge that has computing but maybe the broadband is not as good.

TABLE 3

| App | Score | Cost |
| --- | --- | --- |
| YouTube | 85 | 1.2 |
| Waze | 85 | .06 |
| AR | 85 | 3 |
| Whatsup | 85 | .06 |
| Total | 85 | 4.32 |

Even if communication through the edge costs the same as the tower, one has to pay for the computation as well. This computation cost needs to be compared to the computation cost wherever they are done (in the cloud), but due to the computation being done in the edge, the AR will have much lower latency and will work better. The provider, according to the combination of cost and score, decides which edge/tower the device should connect to. This calls for more complicated contracts as well as premium contracts and is likely to be driven by AR applications.

This computation is done for the better towers and edges, and among them one is chosen. How one chooses given a score and cost depends on the contract.

Figure 3:
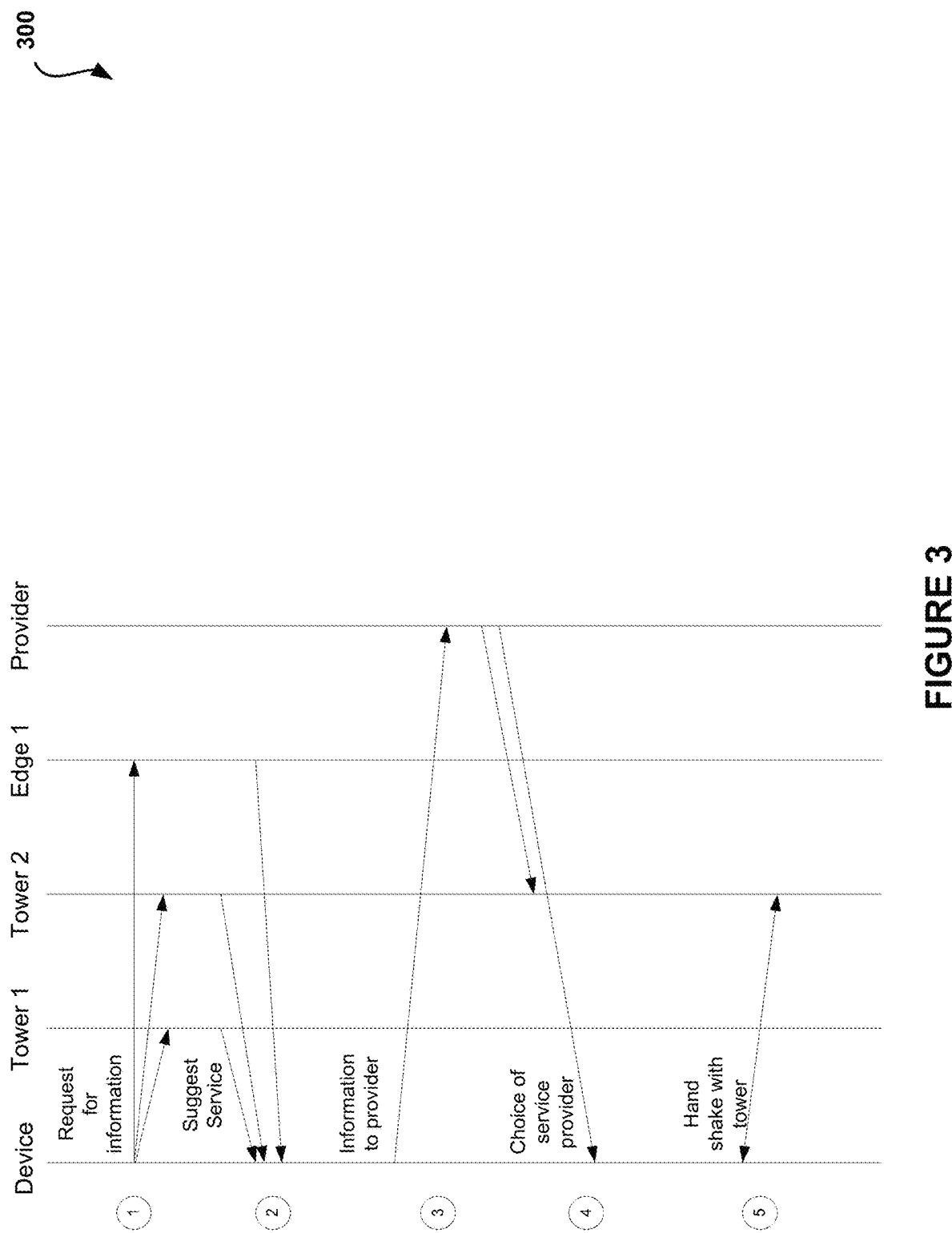
FIG. 3 shows a system flow diagram for implementing various device decisions regarding edges/towers, in accordance with one embodiment.

This is described in FIG. 3, a time diagram. The operations shown in FIG. 3 are as follows: Stage 1) the device asks all the towers and edges for service parameters—some it measures (latency and signal strength) some (quality of CPU and apps) it asks for. Stage 2) all edges and towers reply to the device. Stage 3) the device sends the polling of the edge/towers to the provider along with which workloads it is running, as well as how important is each workload. Stage 4) the provider decides, based on cost and quality, which tower/edge will be used by the device, and informs the device and the tower. Stage 5) the device connects to the tower.

It will be understood that the device can communicate to the provider through the tower and the illustration saying that the device talks directly to the tower is for clarification purpose.

A second embodiment includes splitting workloads between multiple edges/towers.

Assume the device can communicate with multiple edges, multiple providers. One may want some applications with one provider, some applications with another provider, and voice from yet another provider. The reason this may be preferable is that maybe one edge gives a good rate for communication (or has good communication), another may have some applications that the phone wants to run, such that the device can run in the edge and not continue drain battery the phone. The edge may offer bad communication but good computation, so local activities may be better performed on it than a good tower. A closer edge, or an edge with capabilities, may reduce latency over running applications in the cloud, which is more important for some applications (e.g. games, AR, etc.) than others (e.g. browsing, etc.). Control may be by provider (e.g. as to how to split workloads), or by a device.

The device has many workloads (e.g. talking, downloading a movie, AR, computation (e.g. gaming), etc.). Each workload may be communication intensive, computation intensive, specialized (e.g. AR, etc.), or require small latency. Some edges/towers may be better for some of the workloads. The device may be able to be connected to multiple edges or to a limited number of edges (hardware requirement). If so, and the number is not one, a system, etc., may determine how to split the workloads between the edges. The device may not understand enough about the edges, or about contract, to make this determination, so the optimization may be performed by the supplier. Although, in some cases, the determination may be done by the device (for example at home, using the home WiFi, etc.).

As an example, in the home, maybe the tower is a regular tower, and there is also an edge that can perform computation. The setting of the optimization may be, for example: the phone can connect to two edges/towers using a cell; the phone can connect to one edge using WiFi; the list of edges/towers using cell is {x, y, z, etc.}, where capabilities are known; the list of WiFi edges is {y, w, etc.}, where an edge may be in both lists; the list of workloads the phone has, where for each workload its requirement for communication, compute, latency (as above in embodiment one), is listed; and battery situation (how desirable is it to do the computations of the device); etc.

The solution to this problem will be determining which edges/towers to use and which workload to run against each edge/tower.

There are simple cases. For each workload*edge/tower combination the utility for each edge/tower in known. A system can figure out which is the best for each workload. If the system can connect every workload to the best edge/tower for it, this is the best solution.

For example, assume that the number of possible connections is smaller than needed. In this case, the problem shown in Table 4 needs to be solved.

TABLE 4

| Workload | Importance | Tower1 score | Tower 1 cost | edge 1 score | edge 1 cost | edge 2 score | edge 2 cost | Edge 2 score | Edge 3 cost |
|---|---|---|---|---|---|---|---|---|---|
| YouTube | 20 | 90 | 1 | 85 | 1.2 | 95 | 0 | | |
| Waze | 20 | 90 | .05 | 85 | .06 | | | | |
| AR | 20 | 40 | 1 | 85 | 3 | | | | |
| Whatsup | 10 | 90 | .05 | 85 | .06 | | | | |
| Game | 30 | 60 | .2 | 85 | .5 | | | 90 | 1 |

Where there is no score, the edge cannot provide this service.

Assume the device can connect to two out of {tower 1, edge 1, edge 2, edge 3}. It must be determined which two to choose. First, some function of score and cost needs to decide which is the best. For example, if a score (how good it is) is ignored and only cost is a factor, then tower 1 is chosen, which is cheapest on Waze, AR, Whatsup and Game, and edge 2 is cheapest on YouTube, and there is a total cost of 1.3 (ignoring the importance and the score). The other options do not need to be considered as they have nothing cheaper for each workload.

If, on the other hand, weighted score is the only factor, choosing tower 1 and edge 1 gives 0.9*0.2+0.9*0.2+ *.85*0.2+0.9*0.1+0.85*0.3=0.875; and choosing edge 1 and edge 2 gives 0.95*0.2+0.85*0.2+*.85*0.2+0.85*0.1+ 0.85*0.3=0.87. So the first combination is slightly better.

For any given evaluation of cost and utility there may be a different combination of edges/towers that service the device, which may be chosen. Of course, in one case, when the device can access many edges, and not many compete, then every workload will take the best edge for it (for cost/score combination) and optimization is not needed beyond that.

Figure 4:
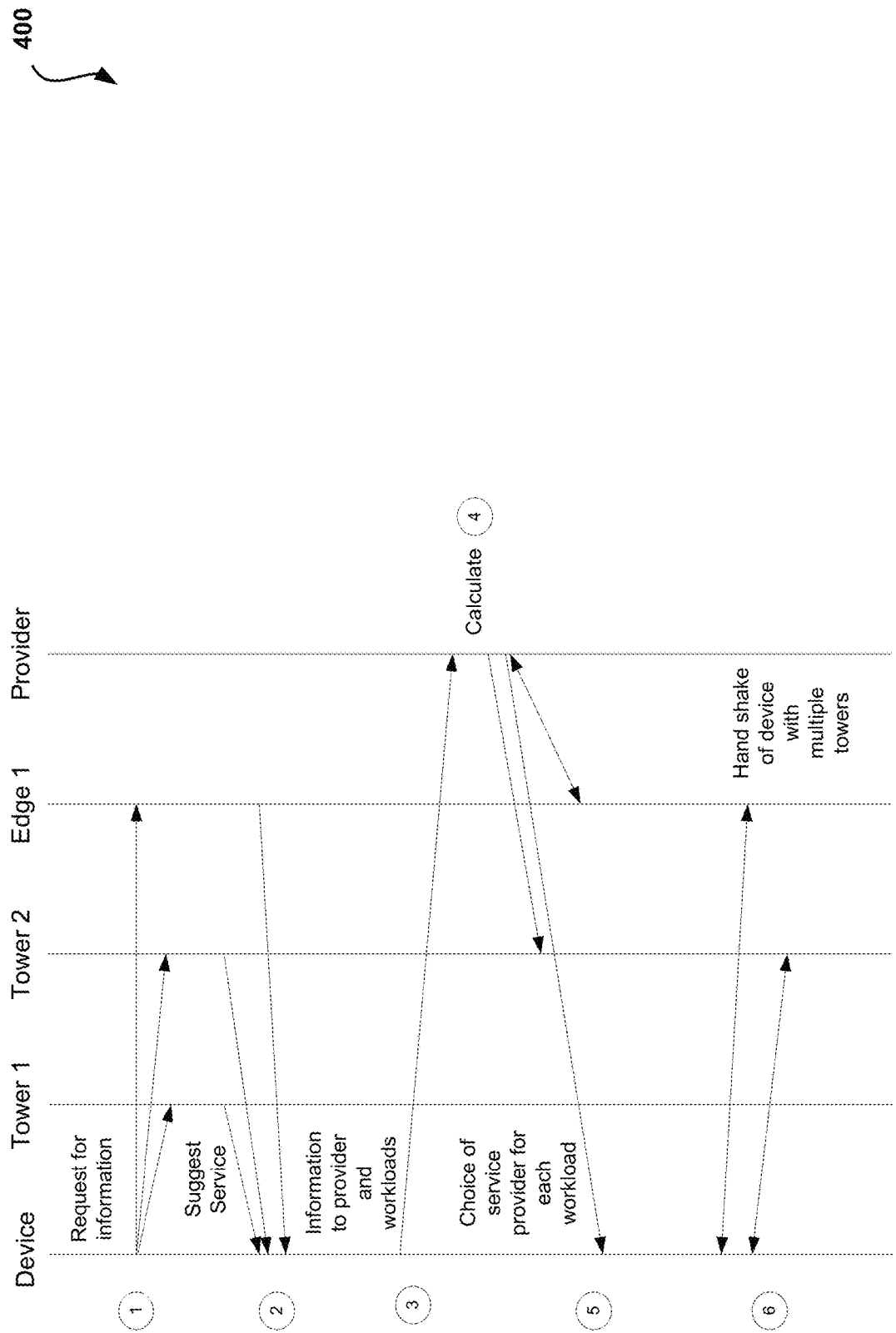
FIG. 4 shows a system flow diagram for implementing various device decisions regarding edges/towers, in accordance with another embodiment.

This is described in FIG. 4, a time diagram. The operations shown in FIG. 4 are as follows: Stage 1) the device asks all the towers and edges for service parameters—some it measures (latency and signal strength) some (quality of CPU and apps) it asks for. Stage 2) all edges and towers reply to the device. Stage 3) the device sends the polling of the edge/towers to the provider along with which workloads it is running, as well as how important is each workload. Stage 4) the provider decides, based on cost and quality, which tower/edge will be used by which workload. Stage 5) the provider informs the device and the towers/edges selected. Stage 6) the device connects to all the towers/edges that will have workloads working with them and assigns each workload to work with the relevant tower.

A third embodiment includes controlling multiple smart devices and deciding how to split the workload between them.

Assume a person has multiple devices, for example, a smartphone and AR glasses (or car and phone, phone and watch and car, etc.). Both, or more than two, are capable of communication with the edges, both belong to that person, and both can be used as hotspot for the other. For example, there may be cars, and users in them, all connected to each other and to the cloud. The devices may all belong to a single provider or to multiple providers.

Figure 5:
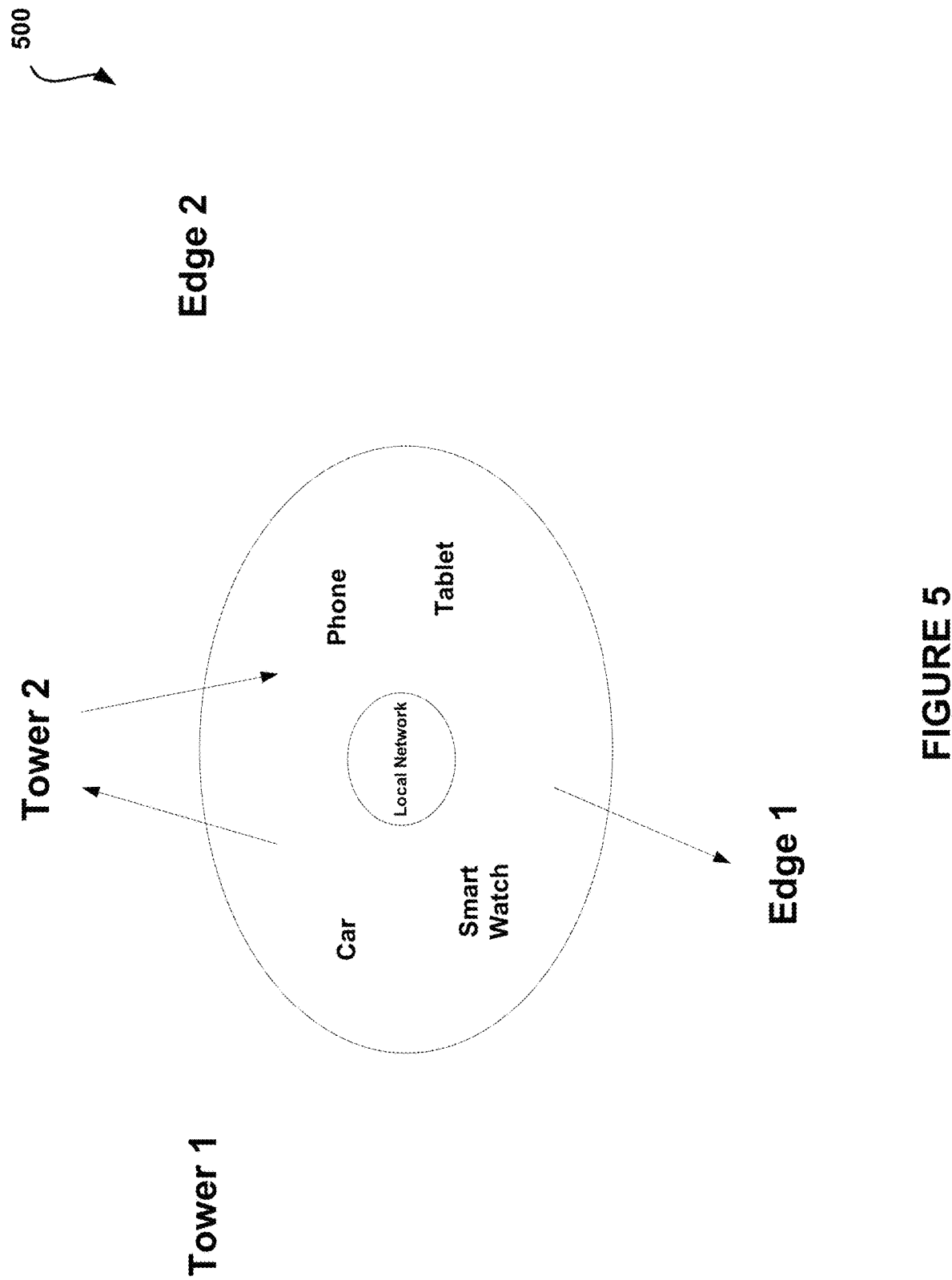
FIG. 5 shows a system diagram example, in accordance with another embodiment.

FIG. 5 shows a system diagram example. The user application runs on four devices, a car, smart phone, smart watch and a tablet. All can communicate over a local network. There are two towers available and two edges. After doing all the calculations, the car and the phone will be connected to tower 2, the smart watch to edge 1, and the tablet only to the local network.

There are two kinds of workloads, one that must be used on one of the devices, as it is meant for it, or another that can be used on multiple devices. For example, the calendar may be viewed through the phone, the car, or the AR device. A person may prefer Waze to be on the car, as it is displayed there and power for the car is less of a concern than power for the phone.

Even if each device can connect to one tower/edge, in this example, there are multiple connections and the devices can each work with a different edge, and divide the workloads to the right edges and perform the inter-communication. A system may determine the division of labor between them, where to run a single application, working with two different edges, according to edges capabilities.

The optimization problem is the following: a list of the relevant devices (AR, car, phone, watch, etc.); for each device, what it can connect to; the list of edges/towers using cell is {x, y, z, etc.}, each with known capabilities; the list of WiFi edges is {y, w, etc.}, where an edge may be in both lists; the list of workloads each device has, where for each workload there is a requirement in communication, compute, latency, and for each workload an indication of devices that are relevant; the battery situation (how desirable is it to do the computations of the device); and costs; etc.

The optimization is similar to the second embodiment above, with the differences are that: the number of connections depend on the number of devices; the cost and score are per device/edge combination; some devices would like less to run the application (due to power for example), which will reflect in the cost, the score, or both; a device can connect to the tower (as before) or to the local network and have other device do the communication for it—this may be cheaper in battery but not as good in latency. The decision of which device will do what is taken by the local network manager, likely to be one of the devices.

Figure 6:
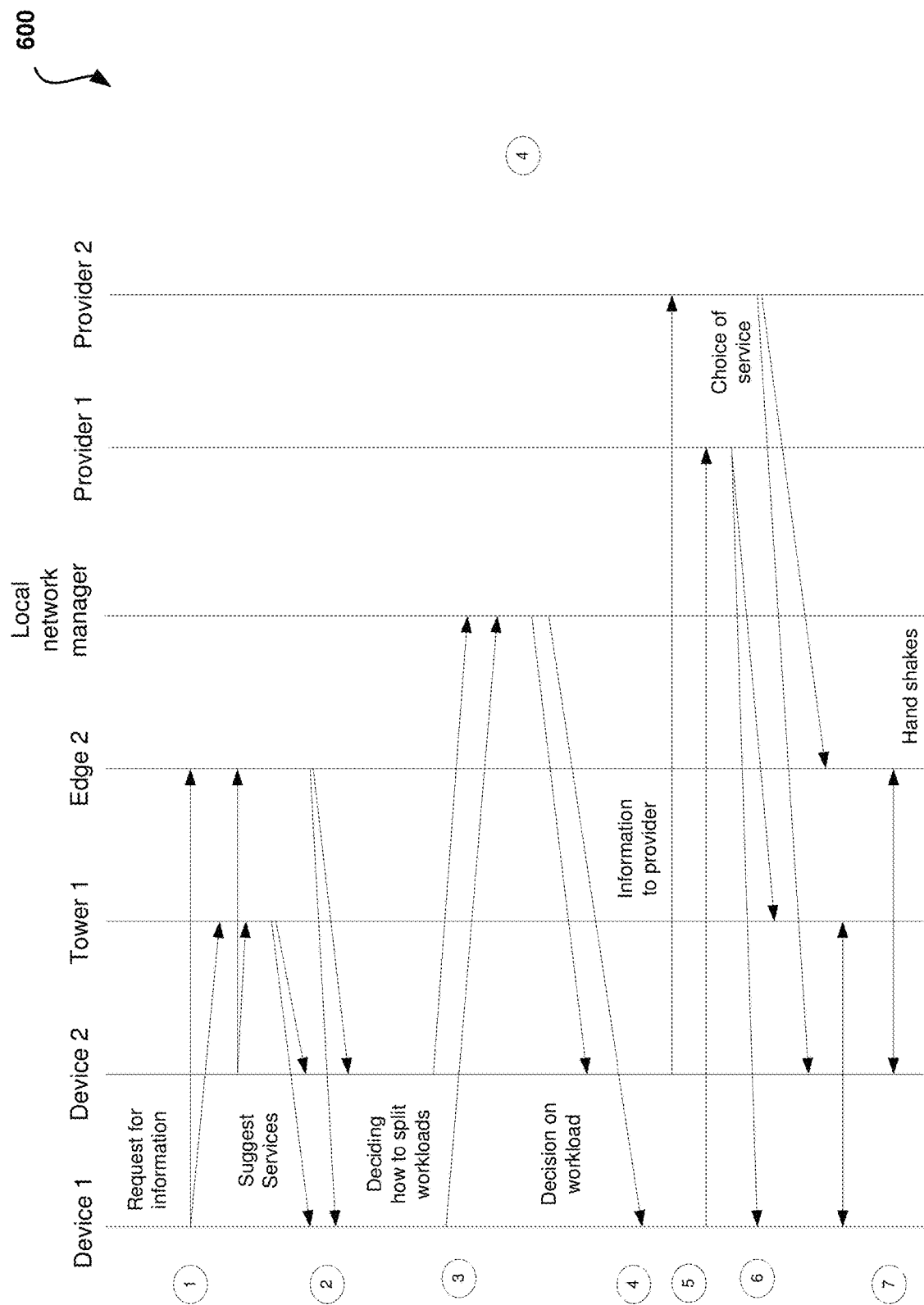
FIG. 6 shows a system flow diagram for implementing various device decisions regarding edges/towers, in accordance with another embodiment.

This is described in FIG. 6, a time diagram. The operations shown in FIG. 6 are as follows: Stage 1) each device asks all the towers and edges for service parameters—some it measures (latency and signal strength) some (quality of CPU and apps) it asks for. Stage 2) all edges and towers reply to all devices. Stage 3) each device sends the polling of the edge/towers to the local network manager along with which workloads it is running, as well as how important is each workload. The local network manager likely is on one of the devices. Stage 4) the local network manager decides which workload will run on which device. Stage 5) each device sends the polling of the edge/towers its provider along with which workloads it is assigned, as well as how important is each workload. Stage 6) the provider decides, based on cost and quality, which tower/edge will be used by the device. Stage 7) the device and the towers/edge handshake.

Figure 7:
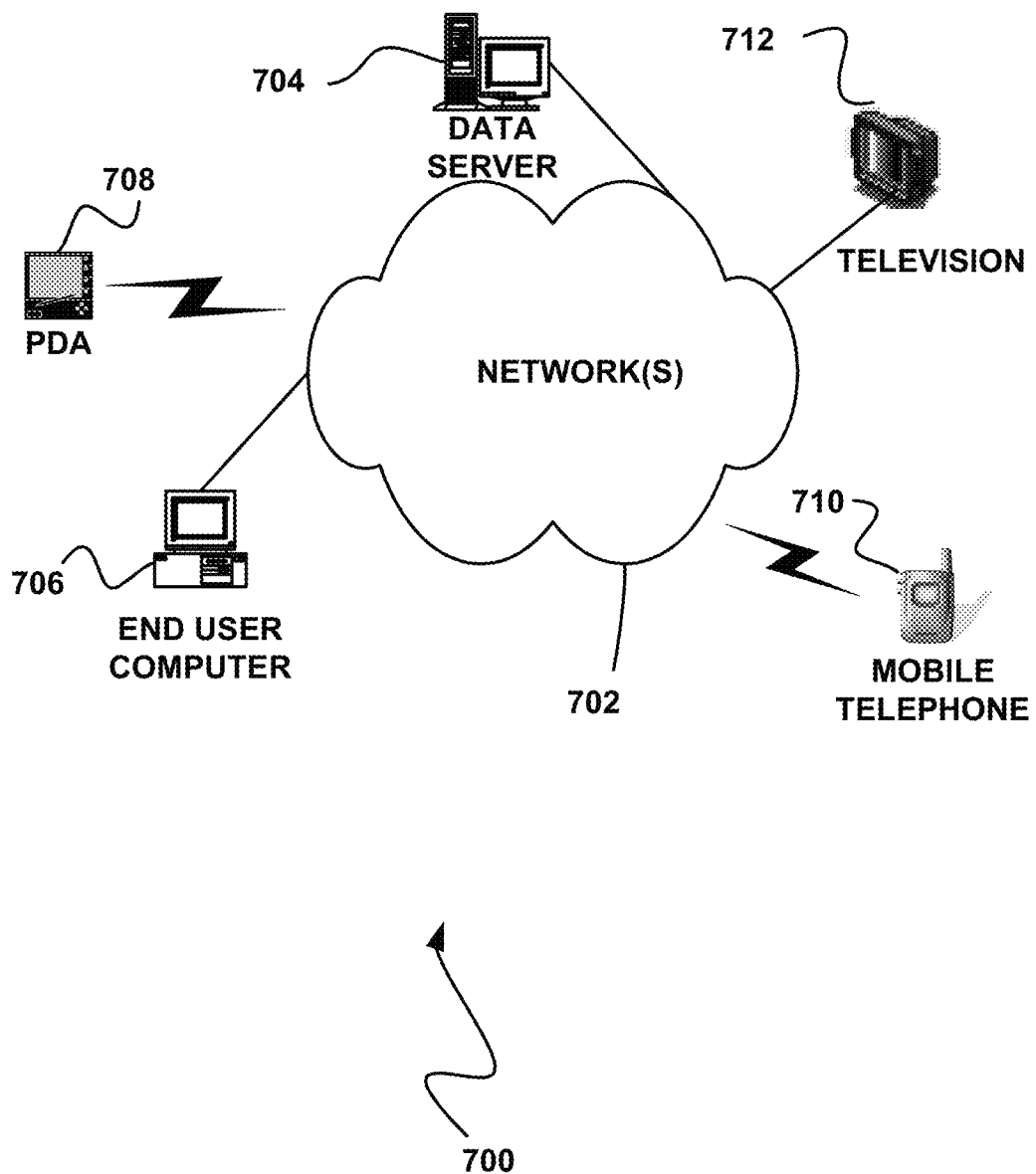
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
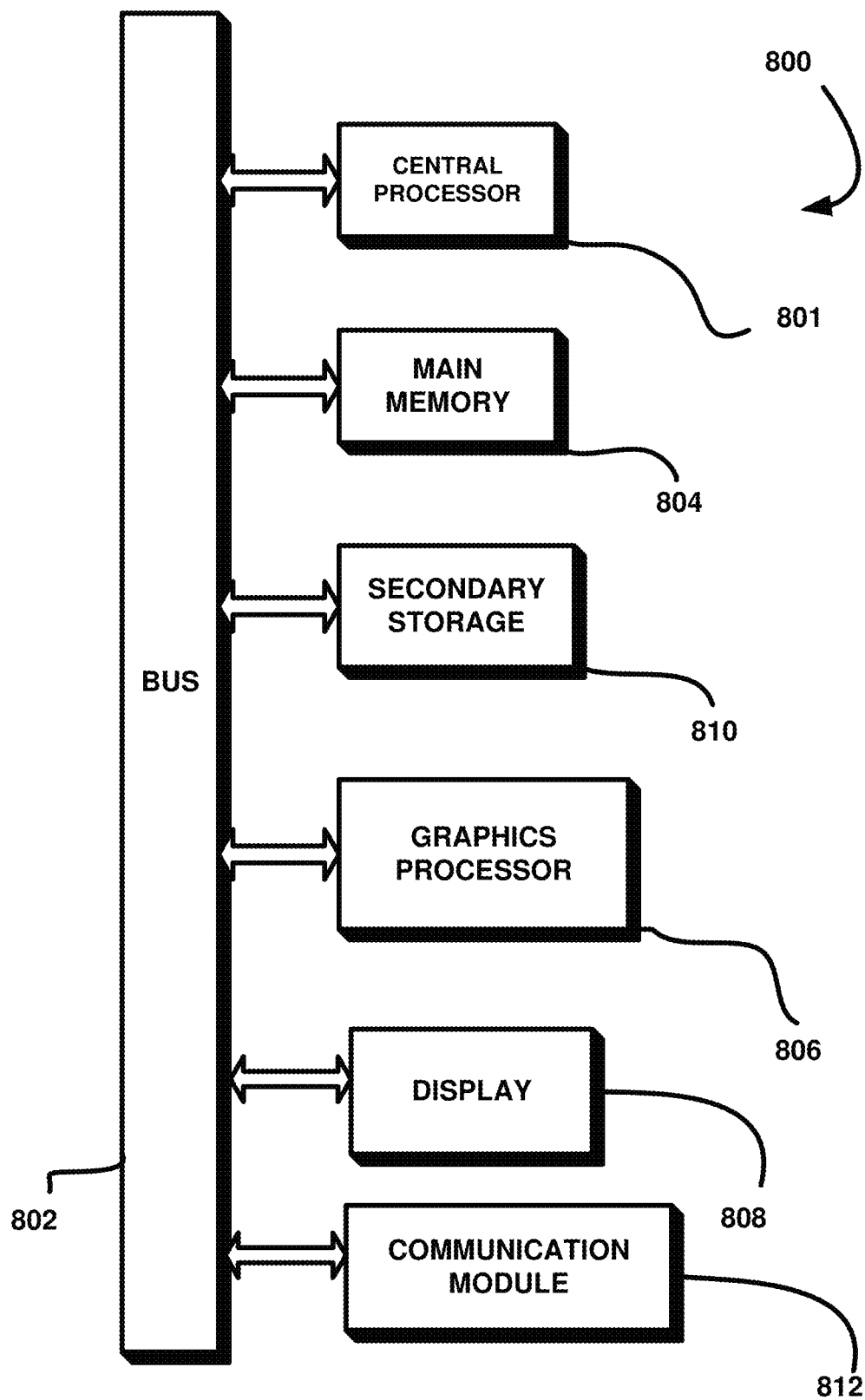
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812.

The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a plurality of workloads of a user device,
   wherein the each workload of the plurality of workloads is associated with a different application running on the user device, and
   wherein each workload of the plurality of workloads has different requirements for communication, compute, and latency;
   splitting the plurality of workloads between multiple edges or towers.

2. The method of claim 1, wherein splitting workloads between multiple edges or towers includes:
   determining a plurality of edges or towers, each to handle a corresponding one of the plurality of workloads,
   connecting the user device to the plurality of edges or towers, and assigning each of the plurality of workloads of the user device to the corresponding one the plurality of edges or towers for handling thereof.

3. The method of claim 2, wherein determining a plurality of edges or towers each to handle a corresponding one of the plurality of workloads includes:
for each of the workloads, choosing the single best edge or tower for the workload.

4. The method of claim 1, wherein the method further comprises:
identifying instances of an additional workload running on multiple smart devices of a user; and
splitting the instances of the additional workload between multiple edges or towers.

5. The method of claim 4, wherein the multiple smart devices are associated with one another.

6. The method of claim 1, wherein the plurality of workloads are split between the multiple edges or towers based on the different requirements of the plurality of workloads and service capabilities of the multiple edges or towers.

7. The method of claim 1, further comprising:
determining a threshold number of edges or towers to which the user device is capable of simultaneously connecting;
wherein the plurality of workloads are split between the multiple edges or towers based on the threshold number.

8. The method of claim 1, wherein the user device splits the plurality of workloads between the multiple edges or towers by determining which of the multiple edges or towers to assign to each workload of the plurality of workloads.

9. The method of claim 1, wherein the user device splits the plurality of workloads between the multiple edges or towers based on a determination by a supplier of which of the multiple edges or towers to assign to each workload of the plurality of workloads.

10. The method of claim 9, wherein the user device collects service capabilities of the multiple edges or towers, sends to the supplier the service capabilities and an indication of the plurality of workflows for use in determining which of the multiple edges or towers to assign to each workload of the plurality of workloads, and receives from the supplier an indication of each of the multiple edges or towers to assign to each workload of the plurality of workloads, and wherein the user device connects to the multiple edges or towers and, based on the indication from the supplier, assigns each workload of the plurality of workloads to a respective one of the multiple edges or towers.

11. A system, comprising:
a non-transitory memory storing instructions; and
one or more processors in communication with the non-transitory memory that execute the instructions to perform a method comprising:
identifying a plurality of workloads of a user device,
wherein the each workload of the plurality of workloads is associated with a different application running on the user device, and
wherein each workload of the plurality of workloads has different requirements for communication, compute, and latency;
splitting the plurality of workloads between multiple edges or towers.

12. The system of claim 11, wherein splitting workloads between multiple edges or towers includes:
determining a plurality of edges or towers, each to handle a corresponding one of the plurality of workloads,
connecting the user device to the plurality of edges or towers, and
assigning each of the plurality of workloads of the user device to the corresponding one the plurality of edges or towers for handling thereof.

13. The system of claim 12, wherein determining a plurality of edges or towers each to handle a corresponding one of the plurality of workloads includes:
for each of the workloads, choosing the single best edge or tower for the workload.

14. The system of claim 11, wherein the method further comprises:
identifying instances of an additional workload running on multiple smart devices of a user; and
splitting the instances of the additional workload between multiple edges or towers.

15. The system of claim 14, wherein the multiple smart devices are associated with one another.

16. A non-transitory computer readable medium storing computer code executable by a processor to perform a method comprising:
identifying a plurality of workloads of a user device,
wherein the each workload of the plurality of workloads is associated with a different application running on the user device, and
wherein each workload of the plurality of workloads has different requirements for communication, compute, and latency;
splitting the plurality of workloads between multiple edges or towers.

* * * * *